(12) United States Patent
Shibagami

(10) Patent No.: US 9,451,150 B2
(45) Date of Patent: Sep. 20, 2016

(54) IMAGE CAPTURING APPARATUS COMPRISING FOCUS DETECTION, AND METHOD FOR CONTROLLING THE SAME

(71) Applicant: CANON KABUSHIKI KAISHA, Tokyo (JP)

(72) Inventor: Genjiro Shibagami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/103,331

(22) Filed: Dec. 11, 2013

(65) Prior Publication Data

US 2014/0176783 A1    Jun. 26, 2014

(30) Foreign Application Priority Data

Dec. 21, 2012 (JP) .................................. 2012-280063

(51) Int. Cl.
    H04N 5/232       (2006.01)
    H04N 5/235       (2006.01)

(52) U.S. Cl.
    CPC ........ H04N 5/23212 (2013.01); H04N 5/2356 (2013.01)

(58) Field of Classification Search
    CPC .................... H04N 5/23212; H04N 5/2356
    USPC ........................................................ 348/349
    See application file for complete search history.

(56) References Cited

U.S. PATENT DOCUMENTS

| 2006/0171697 A1* | 8/2006 | Nojima ......................... 396/103 |
| 2008/0192139 A1* | 8/2008 | Kanai et al. ................... 348/360 |
| 2010/0009115 A1* | 1/2010 | Ruhdorfer ...................... 428/99 |
| 2010/0215354 A1* | 8/2010 | Ohnishi ........................ 396/113 |

FOREIGN PATENT DOCUMENTS

| CN | 1977526 A    | 6/2007 |
| CN | 101300826 A  | 5/2008 |
| CN | 101677361 A  | 3/2010 |
| JP | 2006-227093 A | 8/2006 |

(Continued)

OTHER PUBLICATIONS

The above foreign patent documents were cited in the Jun. 3, 2016 Japanese Office Action, which is unclosed without an English Translation, that issued in Japanese Patent Application No. 2012280063.

(Continued)

*Primary Examiner* — Gevell Selby
(74) *Attorney, Agent, or Firm* — Cowan, Liebowitz & Latman, P.C.

(57) ABSTRACT

An image capturing apparatus comprises: a focus detection unit to obtain an in-focus position for each preset focus detection area; a setting unit to set an object area for a captured image; an acquisition unit to acquire a representative in-focus position of the object area based on in-focus positions contained within a given range where in-focus positions of focus detection areas corresponding to the object area are most concentrated; a determination unit to determine, if a plurality of object areas are set by the setting unit, a priority order of the object areas based on representative in-focus positions of the object areas; and a control unit configured to perform control so as to sequentially drive the focus lens to the representative in-focus positions of the object areas in decreasing order of the priority order and perform shooting.

13 Claims, 12 Drawing Sheets

(56) References Cited

FOREIGN PATENT DOCUMENTS

| | | |
|---|---|---|
| JP | 2006-311505 A | 11/2006 |
| JP | 2008-281714 A | 11/2008 |
| JP | 2008-283453 A | 11/2008 |
| JP | 2010-097211 A | 4/2010 |
| JP | 2010-206552 A | 9/2010 |
| JP | 2010-286752 A | 12/2010 |

OTHER PUBLICATIONS

The above foreign patent documents were cited in a Jul. 5, 2016 Chinese Office Action, which is enclosed with an English Translation, that issued in Chinese Patent Application No. 201310714066.2.

* cited by examiner

FIG. 8A

|   |   |   |   |   |   |   |
|---|---|---|---|---|---|---|
| × | × | × | × | × | × | × |
| × | × | × | × | × | × | × |
| × | 100 | 102 | × | × | × | × |
| 101 | 101 | 190 | 101 | 102 | × | × |
| 101 | 192 | 202 | 102 | 100 | 105 | 100 |
| 102 | 202 | 201 | 101 | 104 | 102 | 100 |
| 101 | 182 | 201 | 285 | 302 | 280 | 100 |
| 103 | 100 | 160 | 250 | 300 | 290 | 100 |
| 103 | 102 | 160 | 102 | 280 | 282 | 100 |

|   |   |   |   |   |   |   |
|---|---|---|---|---|---|---|
| × | × | × | × | × | × | × |
| × | × | × | × | × | × | × |
| × | × | × | × | × | × | × |
| × | × | 195 | × | × | × | × |
| × | 190 | 201 | × | × | × | × |
| × | 200 | 200 | × | × | × | × |
| × | 198 | 200 | 305 | 300 | 290 | × |
| × | × | 200 | 300 | 298 | 298 | × |
| × | × | 195 | × | 299 | 295 | × |

|   |   |   |   |   |   |   |
|---|---|---|---|---|---|---|
| × | × | × | × | × | × | × |
| × | × | × | × | × | × | × |
| × | 100 | 102 | × | × | × | × |
| 101 | 101 | 190 | 101 | 102 | × | × |
| 101 | 192 | 202 | 102 | 100 | 105 | 100 |
| 102 | 202 | 201 | 101 | 104 | 102 | 100 |
| 101 | 198 | 201 | 305 | 302 | 290 | 100 |
| 103 | 100 | 200 | 300 | 300 | 298 | 100 |
| 103 | 102 | 195 | 102 | 299 | 295 | 100 |

IMAGE CAPTURING APPARATUS COMPRISING FOCUS DETECTION, AND METHOD FOR CONTROLLING THE SAME

BACKGROUND OF THE INVENTION

1. Field of the Invention

The present invention relates to an image capturing apparatus and a method for controlling the image capturing apparatus, and more particularly relates to an image capturing apparatus that performs shooting in a plurality of focus states and a method for controlling the image capturing apparatus.

2. Description of the Related Art

Conventionally, there has been proposed a technology of performing image processing based on a distance computed for each partial area within an image capturing range (see Japanese Patent Laid-Open No. 2006-311505, for example). There also has been proposed a focus bracketing technology of performing shooting while moving the focus lens position so as to sequentially adjust focus to different objects based on distances of respective partial areas (see Japanese Patent Laid-Open No. 2010-286752, for example).

However, when focus bracketing is performed based on the distances of the partial areas as disclosed in Japanese Patent Laid-Open No. 2010-286752, the following problem arises. That is to say, if each partial area contains a plurality of focus detection areas, it is difficult to select which focus detection area is appropriate for adjusting focus using the focus detection result (in-focus position) of that focus detection area.

SUMMARY OF THE INVENTION

The present invention has been made in consideration of the above situation, and enables an appropriate in-focus position of each object to be acquired when sequentially capturing images while adjusting focus to a plurality of objects.

According to the present invention, provided is an image capturing apparatus comprising: a focus detection unit configured to obtain an in-focus position for each of a plurality of preset focus detection areas, the in-focus position indicating a position to which a focus lens is to be driven in order to achieve focus; a setting unit configured to set an object area with respect to a captured image; an acquisition unit configured to acquire, for each object area set by the setting unit, a representative in-focus position that is representative of the object area based on in-focus positions contained within a given range where in-focus positions of focus detection areas corresponding to the object area are most concentrated; a determination unit configured to determine, if a plurality of object areas are set by the setting unit, a priority order of the object areas based on representative in-focus positions respectively acquired for the object areas; and a control unit configured to perform control so as to sequentially drive the focus lens to the representative in-focus positions of the object areas in decreasing order of the priority order determined by the determination unit and perform shooting with a plurality of different focus lens positions.

Further, according to the present invention, provided is a method for controlling an image capturing apparatus, the method comprising: a focus detection step of obtaining an in-focus position for each of a plurality of preset focus detection areas, the in-focus position indicating a position to which a focus lens is to be driven in order to achieve focus; a setting step of setting an object area with respect to a captured image; an acquisition step of acquiring, for each object area set in the setting step, a representative in-focus position that is representative of the object area based on in-focus positions contained within a given range where in-focus positions of focus detection areas corresponding to the object area are most concentrated; a determination step of determining, if a plurality of object areas are set in the setting step, a priority order of the object areas based on representative in-focus positions respectively acquired for the object areas; and a control step of performing control so as to sequentially drive the focus lens to the representative in-focus positions of the object areas in decreasing order of the priority order determined in the determination step and perform shooting with a plurality of different focus lens positions.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 8A to 8C are diagrams illustrating examples of the result of acquisition and the result of synthesis of peak positions according to an embodiment;

FIG. 10 is a diagram illustrating focus detection areas corresponding to object areas according to an embodiment.

DESCRIPTION OF THE EMBODIMENTS

Exemplary embodiments of the present invention will be described in detail in accordance with the accompanying drawings.

Block Diagram of Image Capturing Apparatus

Figure 1:
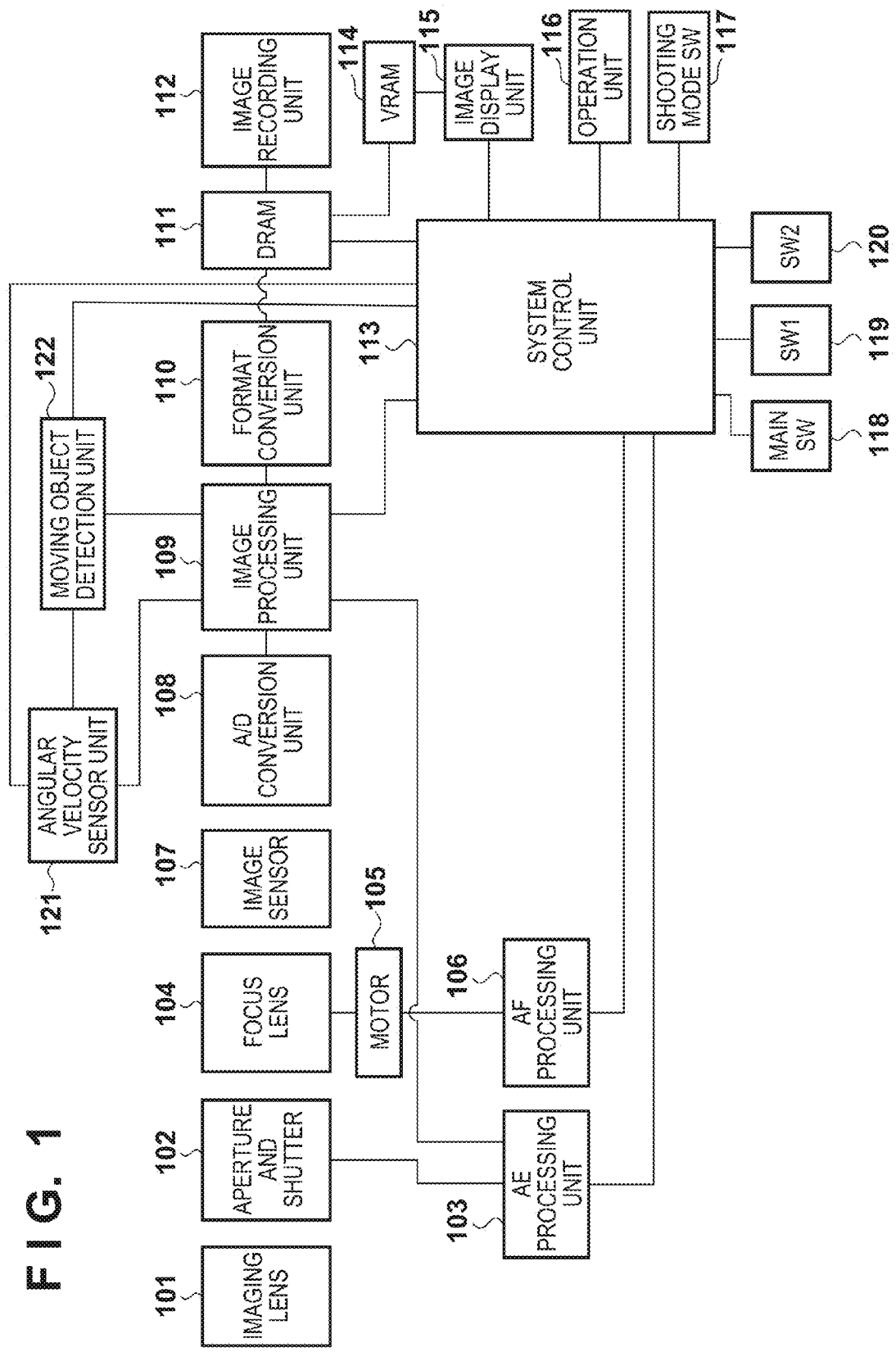
FIG. 1 is a block diagram illustrating the configuration of an image capturing apparatus according to an embodiment of the present invention.

FIG. 1 is a block diagram illustrating the configuration of an electronic camera serving as an image capturing apparatus according to an embodiment of the present invention. In FIG. 1, light reflected from an object and entering through a photographing lens 101 that includes a zoom mechanism and through an stop/shutter 102 that controls the quantity of light is imaged onto an image sensor 107 by a focus lens 104 to form an object image thereon. The image sensor 107 receives the imaged light, converts the light into an electrical signal, and outputs the electrical signal to an A/D conversion unit 108. The A/D conversion unit 108 includes a CDS circuit that reduces output noise from the electrical signal output from the image sensor 107, a non-linear amplification circuit that performs non-linear amplification before A/D conversion, and an A/D conversion circuit that performs A/D conversion, and outputs a digital signal, into which the electrical signal has been converted, to an image processing unit 109 as an image signal.

In the image processing unit 109, the image signal output from the A/D conversion unit 108 is subjected to given image processing such as gamma conversion, converted into a format that is suitable for recording or displaying by a format conversion unit 110, and stored in an internal memory 111. The internal memory 111 is a high-speed memory such as, for example, a random access memory and will be referred to as "DRAM" below. The DRAM 111 is used as a high-speed buffer that temporarily stores images, or as a work memory for use in compressing/expanding images. An image recording unit 112 is composed of a recording medium such as a memory card and an interface thereof, and images and the like are recorded via the DRAM 111. An image display unit 115 not only performs image display but also performs display for assisting operations and display of the state of the camera and performs display of a shooting screen and focus detection areas during shooting. The display is performed via an image display memory 114 (hereinafter referred to as "VRAM").

An operation unit 116 is a unit for externally operating the camera and includes, for example, switches and the like as follows: menu switches for making various settings such as settings of shooting functions of the image capturing apparatus and settings to be applied during image reproduction, a zoom lever for instructing a zoom operation of the photographing lens 101, an operation mode changing switch for switching between a shooting mode and a reproducing mode, and the like. A shooting mode switch 117 is a switch for selecting a shooting mode such as a macro mode, a landscape mode, a sports mode, and the like, and in this embodiment, an AF scan range, an AF operation, and the like are changed according to the shooting mode that is selected by a user. The camera further has a main switch 118 for supplying power to the system, a switch 119 (hereinafter referred to as "SW1") for performing a preparatory operation for shooting, such as AF and AE, and a shooting switch 120 (hereinafter referred to as "SW2") for performing shooting after the SW1 has been operated.

A system control unit 113 controls the entire system including a shooting sequence. Moreover, the system control unit 113 also performs processing for detecting an object from image data that has been processed by the image processing unit 109. An AE processing unit 103 performs metering processing with respect to an image signal that is output from the image processing unit 109 after image processing, obtains an AE evaluation value for use in exposure control, and controls the exposure by controlling the shutter speed, aperture, and sensitivity. It should be noted that in the case where the image sensor 107 has an electronic shutter function, the AE processing unit 103 also controls the reset and read-out timings of the image sensor 107. An AF processing unit 106 computes an AF evaluation value from the contrast of an image, obtains an in-focus position based on the computed AF evaluation value (focus detection), and drives the focus lens 104 by driving a motor 105. A higher AF evaluation value indicates higher contrast and thus indicates that the image is closer to an in-focus state, whereas a lower AF evaluation value indicates lower contrast and thus indicates that the image is further from the in-focus state.

An angular velocity sensor unit 121 detects a motion of the camera due to camera shake, panning, and the like. A moving object detection unit 122 detects a moving object based on a captured video image output signal.

Operation of Image Capturing Apparatus

Figure 2:
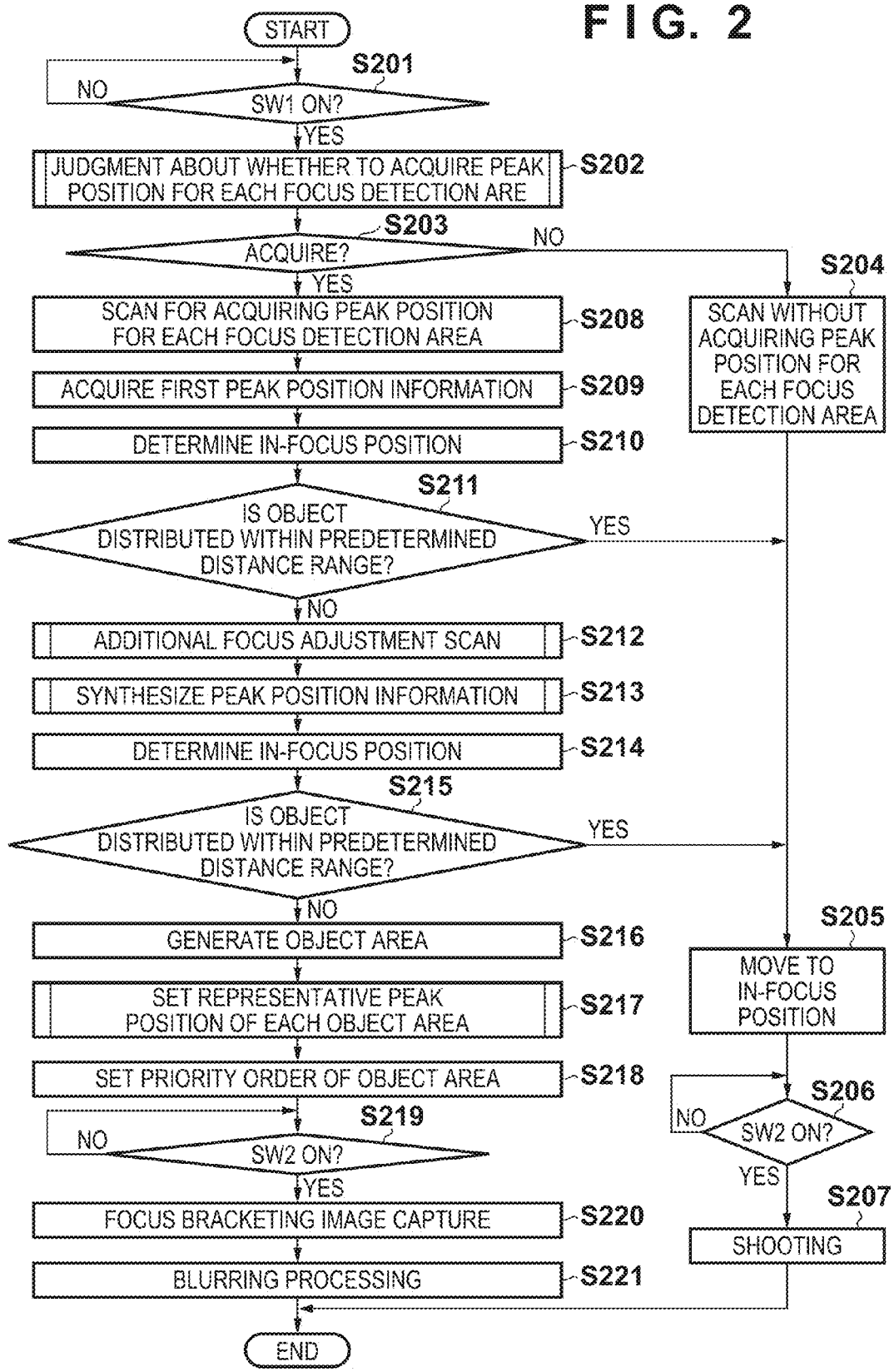
FIG. 2 is a flowchart illustrating a main routine during shooting according to an embodiment.

Next, operations according to the embodiment of the image capturing apparatus having the above-described configuration will be described in accordance with a flowchart in FIG. 2. FIG. 2 is a flowchart illustrating a main routine during shooting. First, in step S201, it is judged whether the SW1 (119) is pressed. If it is judged that the SW1 (119) is not pressed, the procedure returns to step S201, and judgment with respect to the SW1 (119) is repeated.

If it is judged that the SW1 (119) is pressed, the procedure proceeds to step S202, and it is judged whether a peak position is to be acquired for each focus detection area. It should be noted that a peak position refers to a focus lens position at which the AF evaluation value is maximum, that is, a focus lens position at which the focus detection area is in focus (in-focus position of each focus detection area).

Judgment about Whether to Acquire Peak Position for Each Focus Detection Area

Figure 3:
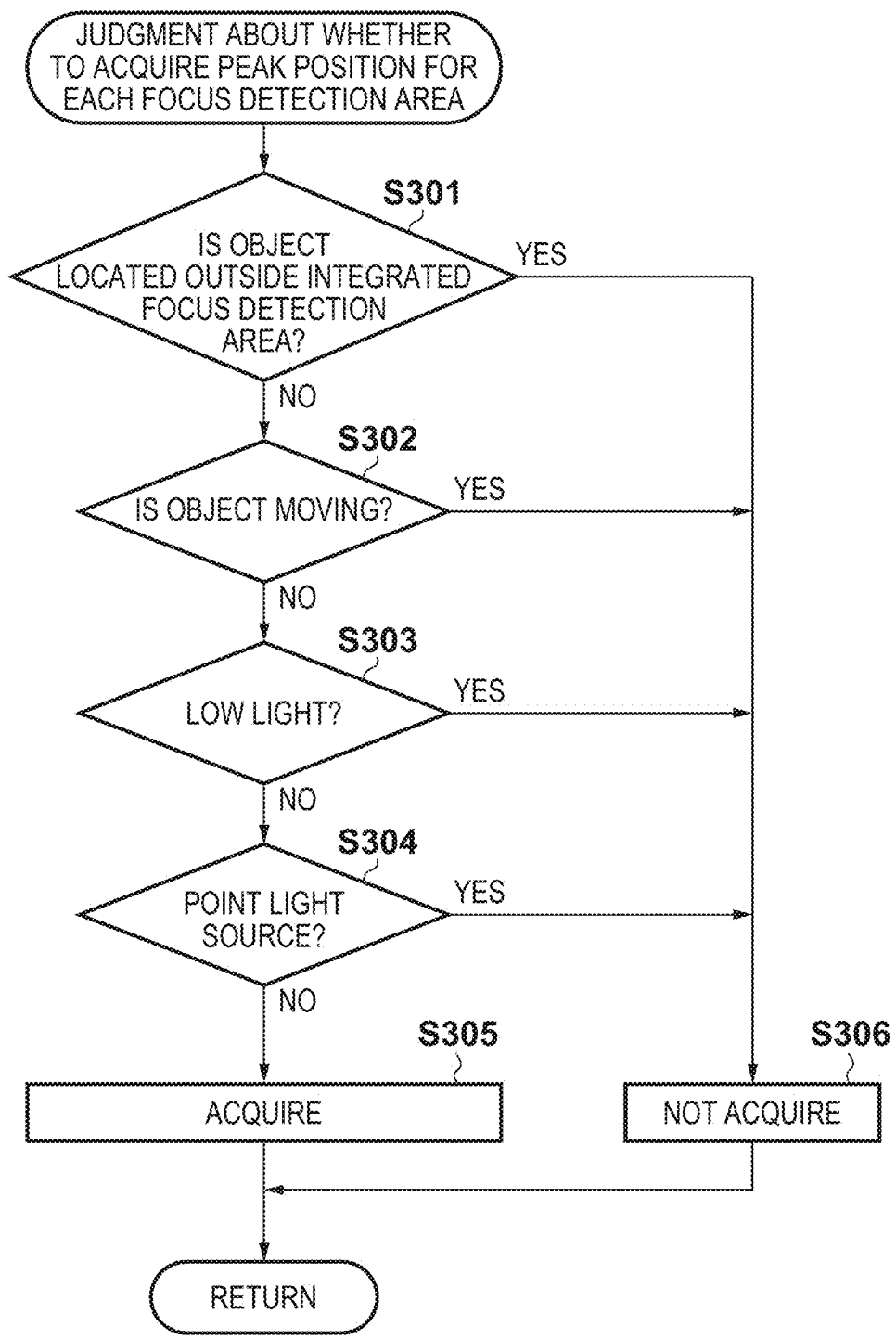
FIG. 3 is a flowchart of processing judging whether to acquire a peak position according to an embodiment.

Here, processing judging whether to acquire a peak position for each focus detection area, which is performed in step S202, will be described using FIG. 3. To acquire a peak position for each focus detection area, the focus lens 104 may be driven (scanned) across an area from an infinite distance to a close distance in order to acquire distance information regarding all objects within a screen, and this may take a long period of time. To address this issue, judgment about whether the conditions are suitable for performing a scan for acquiring a peak position for each focus detection area is made, thereby avoiding having to perform an unnecessary scan.

Figure 7A:
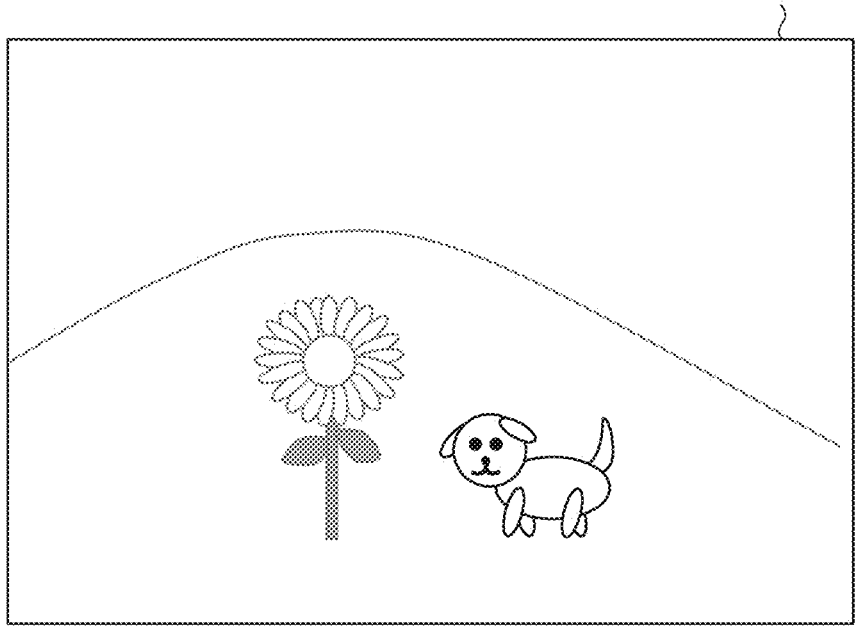
FIGS. 7A and 7B are diagrams for explaining focus detection areas according to an embodiment.
Figure 7B:
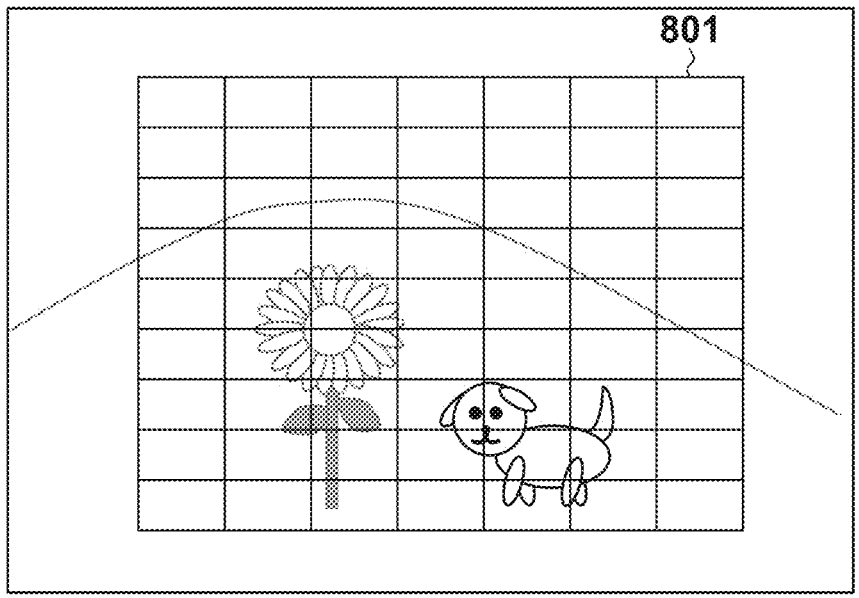

First, in step S301, it is judged whether a detected object is located outside a plurality of focus detection areas that are arranged. In this embodiment, for example, with respect to an image 701 as shown in FIG. 7A, focus detection areas are arranged in 9 rows and 7 columns as shown in FIG. 7B. It should be noted that these focus detection areas that are arranged in 9 rows and 7 columns will be collectively referred as an integrated focus detection area 801.

If the detected object is located outside the integrated focus detection area 801, the distance to that object cannot be measured, and therefore it is unnecessary to acquire a peak position for each focus detection area. Thus, if it is judged that the object is outside the integrated focus detection area 801 (YES in step S301), it is judged in step S306 that acquisition of a peak position for each focus detection area is not to be performed, and the processing is ended.

If it is judged that the detected object is located within the integrated focus detection area 801 (NO in step S301), it is judged whether the detected object is moving in step S302. If the object is moving (YES in step S302), focus detection cannot be correctly performed, and therefore it is not possible to acquire a peak position for each focus detection area. Thus, it is judged in step S306 that acquisition of a peak position for each focus detection area is not to be performed, and the processing is ended.

If it is judged that the object is not moving (NO in step S302), it is judged whether a shooting scene is low light in step S303. If the shooting scene is low light, it is necessary to apply a gain in order to maintain proper luminance, but if a gain of a certain level or more is applied, it is no longer possible to correctly perform focus detection, and therefore it is not possible to acquire a peak position for each focus detection area. Thus, if it is judged that the shooting scene is low light (YES in step S303), it is judged in step S306 that acquisition of a peak position for each focus detection area is not to be performed, and the processing is ended.

If it is judged that the shooting scene is not low light (NO in step S303), it is judged whether the shooting scene is a point light source in step S304. A point light source means a scene in which a light source is small and appears as a dot, and for such a scene, focus detection cannot be correctly performed, and it is not possible to acquire a peak position for each focus detection area. Thus, if it is judged that the shooting scene is a point light source (YES in step S304), it is judged in step S306 that acquisition of a peak position for each focus detection area is not to be performed, and the processing is ended.

If it is judged that the shooting scene is not a point light source (NO in step S304), it is judged in step S305 that acquisition of a peak position for each focus detection area is to be performed, and the processing is ended.

As a result of the above-described processing in step S202, if it is judged in step S203 that acquisition of a peak position for each focus detection area is not to be performed, the procedure proceeds to step S204, and a scan is performed by moving the focus lens 104 to acquire AF evaluation values without acquiring a peak position for each focus detection area. Here, for example, the AF evaluation values are acquired based on an image signal and the like available from a predetermined area such as an area near the center of the screen, the entire screen, or the like. Then, based on the acquired AF evaluation values, the focus lens 104 is moved to an in-focus position in step S205. It should be noted that the in-focus position here refers to a peak position that is judged to be a peak position at which focus should be adjusted with respect to the entire image, and, for example, the peak position at the closest distance of peak positions that are obtained based on the AF evaluation values may be taken as the in-focus position.

Next, in step S206, it is judged whether the SW2 (120) is pressed. If it is judged that the SW2 (120) is not pressed, the procedure returns to step S206, and judgment with respect to the SW2 (120) is repeated. If it is judged that the SW2 (120) is pressed, shooting is performed in step S207. Here, for example, bracketing may be performed in which images are successively captured while changing the exposure conditions, color effect filter, and the like.

On the other hand, if it is judged in step S203 that acquisition of a peak position for each focus detection area is to be performed, the procedure proceeds to step S208. In step S208, in order to acquire a peak position for each focus detection area, a plurality of focus detection areas are arranged within the screen, and a scan for acquiring a peak position for each focus detection area (hereinafter simply referred to as "peak position acquiring scan") is performed to acquire an AF evaluation value for each area. It should be noted that although it is assumed that the focus detection areas are arranged in, for example, 9 rows and 7 columns as shown in FIG. 7B as described above, the present invention is not limited to this arrangement, and any other arrangement that can tell distances within the screen may also be adopted.

Next, in step S209, based on the AF evaluation values acquired in step S208, a peak position of each focus detection area (in-focus position of each focus detection area) is acquired. Hereinafter, the peak position of each focus detection area that is acquired in this step will be referred to as "first peak position information", and an example thereof is shown in FIG. 8A. It should be noted that "x" in FIG. 8A represents an unusable focus detection result in the case where focus detection could not be correctly performed for the reasons that the contrast of the object is low, the object moved out of the focus detection area during the scan, or the like.

Next, in step S210, a peak position at which the focus should be achieved, that is, an in-focus position is selected from the first peak position information. Now, a method for determining the in-focus position will be described.

Figure 9A:
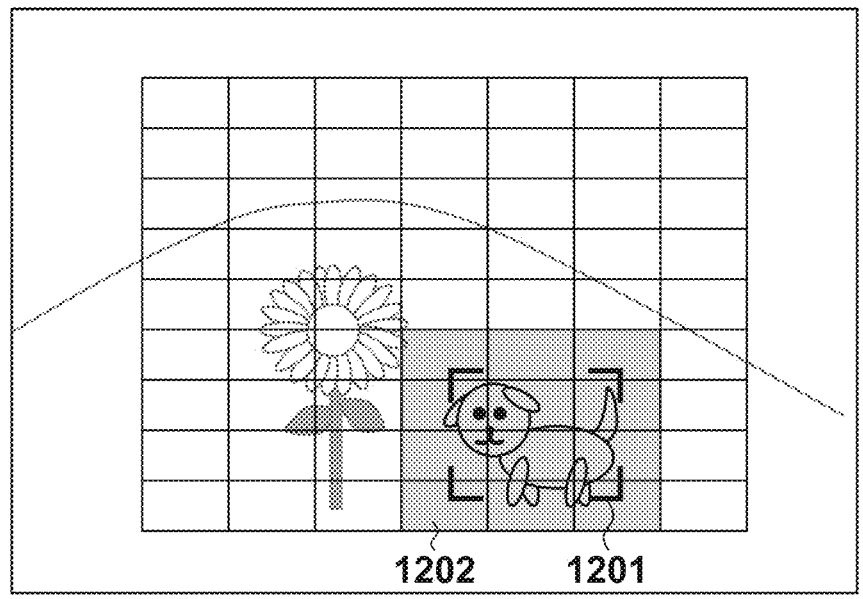
FIGS. 9A and 9B are diagrams illustrating a method for determining an area from which a peak position is to be selected according to an embodiment.
Figure 9B:
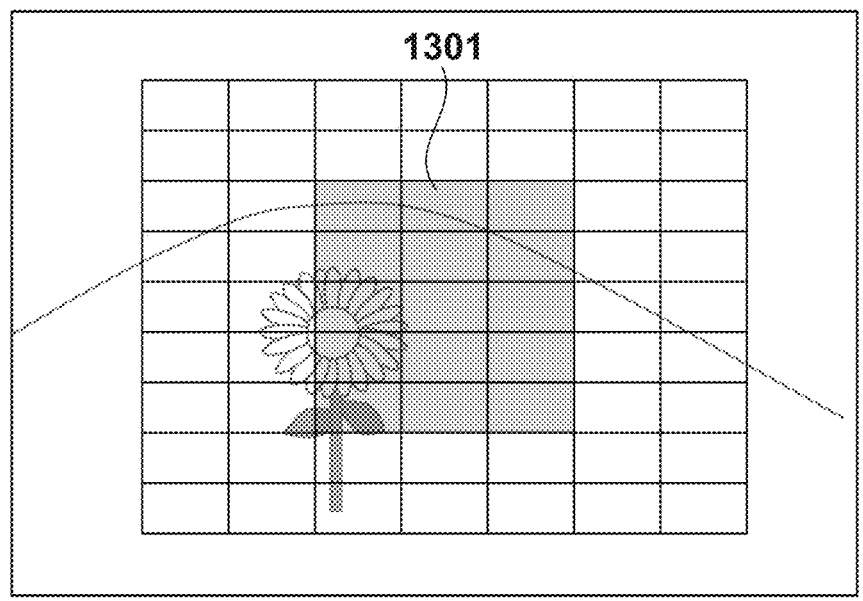

If an object is detected, an object frame 1201 is displayed on the screen as shown in FIG. 9A. This object frame 1201 indicates an area that is judged to be the object. An area indicated by focus detection areas 1202 overlapping this object area is used as an area from which a peak position is to be selected. On the other hand, if no object is detected, a given area 1301 in the middle of the screen as shown in FIG. 9B is used as the area from which a peak position is to be selected.

Then, it is judged whether focus detection areas having peak positions within a given depth and being adjacent to each other are present in the selected area. Focus detection areas that satisfy this condition will be referred to as adjacent focus detection areas. If adjacent focus detection areas are present, an adjacent focus detection area, of those adjacent focus detection areas, that has a peak position at the closest distance is selected, and this peak position is selected as the in-focus position. If adjacent focus detection areas are not present, a peak position at the closest distance of those in the selected area is used as the in-focus position.

Next, in step S211, using the first peak position information, it is judged whether there is no difference in distance between objects of the shooting scene, that is, whether the objects are distributed within a given distance range. In the distance distribution judgment of this embodiment, comparison of the first peak position information is performed, and if the difference is small, it is judged that the objects are distributed within the given distance range. It should be noted that the distance distribution judgment may also be performed using any other method that enables judgment about whether the objects are within the given distance range.

If it is judged that the objects are distributed within the given distance range, the procedure proceeds to step S205, and the above-described processing is performed. It should be noted that in step S205, the focus lens 104 is moved to the in-focus position obtained in step S210. If it is judged in step S211 that the objects are not within the given distance range, then, in step S212, additional focus adjustment scan processing is performed.

Additional Focus Adjustment Scan

Now, additional focus adjustment scan processing that is performed in step S212 will be described with reference to a flowchart in FIG. 4. First, in step S401, it is judged whether any object is detected and whether the detected object is a face. If it is judged that the detected object is a face, the size of the object is detectable, and therefore in next step S402, the integrated focus detection area is reset so as to fit the size of that object in order to suppress focusing on the background. It should be noted that although it is assumed that resetting is performed if the object is judged to be a face in this embodiment, the integrated focus detection area may also be reset regardless of the type of the object as long as the size of the object is detectable.

Figure 11A:
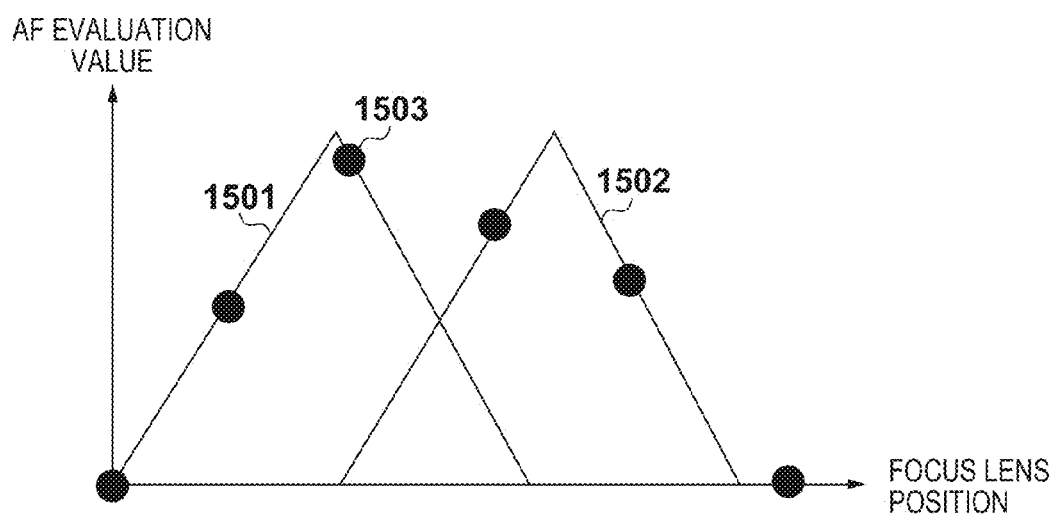
FIGS. 11A and 11B are diagrams for explaining focusing on the background according to an embodiment.
Figure 11B:
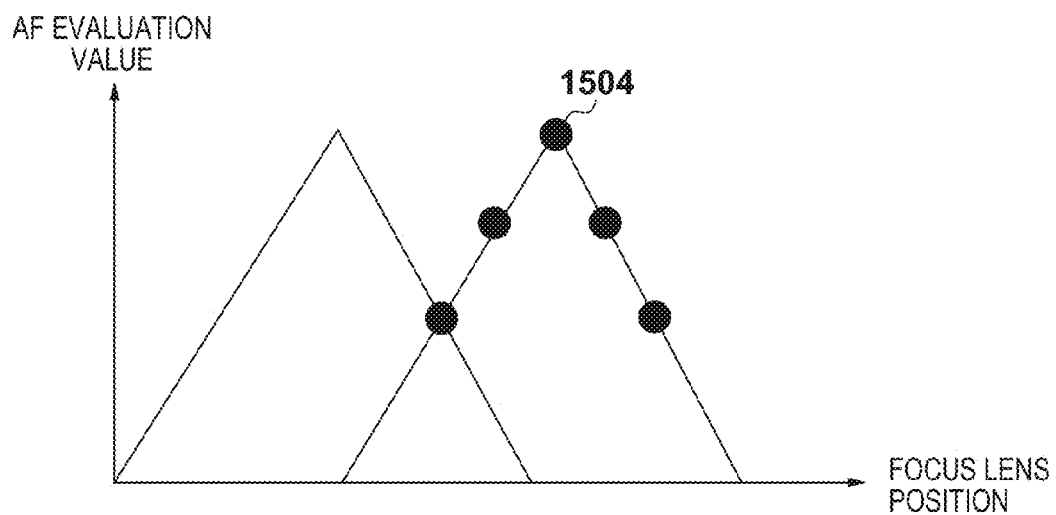

Now, focusing on the background will be described using FIGS. 11A and 11B. In FIG. 11A, reference numeral 1501 indicates AF evaluation values of an object that is located on the infinite distance side, reference numeral 1502 indicates AF evaluation values of another object that is located closer than the aforementioned object, and reference numeral 1503 indicates a position at which an AF evaluation value is acquired by a peak position acquiring scan.

In the above-described peak position acquiring scan, since scanning is performed over a wide range from an infinite distance side to a close distance side, the focus lens 104 is moved at high speed. Accordingly, the distance between adjacent points at which respective AF evaluation values are acquired increases. In addition, since a peak position is obtained from AF evaluation values of the objects both on the infinite distance side and on the close distance side, even if an object is present on the close distance side, this object may be affected by an object that is present on the infinite distance side. This phenomenon is referred to as focusing on the background.

Next, in step S403, scan parameters including the speed at which the focus lens 104 is moved during a scan and the number of points at which an AF evaluation value is to be acquired are set. The speed at which the focus lens 104 is moved in an additional focus adjustment scan is set at a speed that is lower than that during a peak position acquiring scan.

It should be noted that if the size of the object is known and the focus detection areas are set so as to prevent focusing on the background, focusing on the background does not occur, and therefore the scan parameters may be set differently from those in the case where the size of the object is not known.

Next, in step S404, a scan range of the focus lens 104 is set. The scan range is set with the in-focus position, which is determined in step S210 in FIG. 2, at its center. Since a position at which the object is in focus is selected as the in-focus position, if a scan is performed with this position at the center of the scan range, the peak position of the target object can be correctly specified. Thus, AF evaluation values can be acquired from a narrow range as indicated by reference numeral 1504 in FIG. 11B, and it is possible to calculate the peak position of the object that is present on the close distance side without being affected by the object that is present on the infinite distance side.

Next, in step S405, an additional focus adjustment scan is performed using the thus set scan parameters and scan range, and a peak position of each focus detection area of the integrated focus detection area is acquired based on the acquired AF evaluation values. The thus obtained peak position of each focus detection area of the integrated focus detection area will be referred to as "second peak position information" below, and an example thereof is shown in FIG. 8B. In FIG. 8B, "x" is shown in focus detection areas in which focus detection has not been correctly performed for the reasons that the area is outside the integrated focus detection area, the contrast of the object is low, the object moved out of the focus detection area during the scan, the object is not present within the scan range, and so on. It should be noted that a situation in which the object is not present within the scan range arises when the object is located closer than an end of the scan range on the close distance side or when the object is located farther than an end of the scan range on the infinite distance side.

Performing this additional focus adjustment scan makes it possible to acquire a focus position suitable for an object if the object area of that object is known as in the case of a face, and makes it possible to acquire a focus position less affected by a conflict between far and near objects even if the size of the object is not known.

Figure 4:
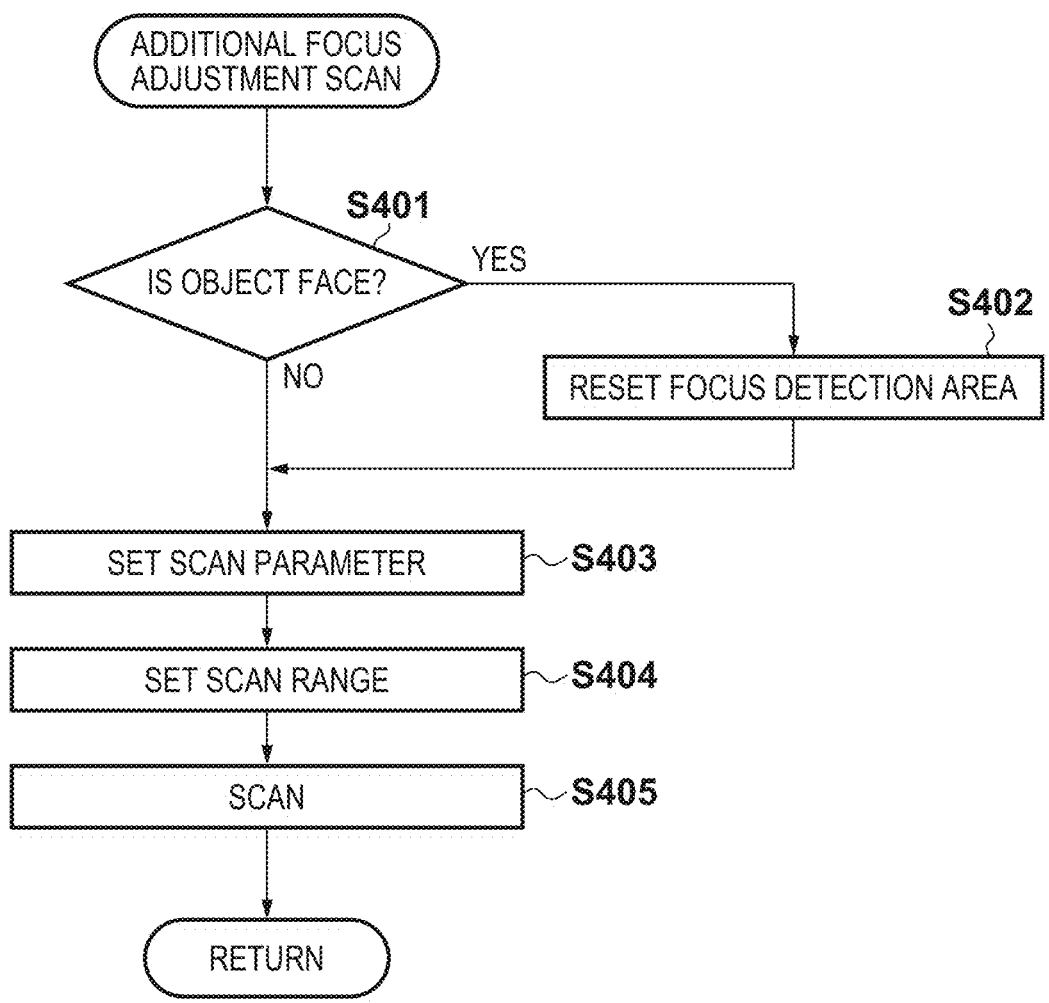
FIG. 4 is a flowchart of additional focus adjustment scan processing according to an embodiment.

When the additional focus adjustment scan illustrated in FIG. 4 has been ended, the procedure proceeds to step S213 in FIG. 2, and the processing result of the additional focus adjustment scan in step S212 (second peak position information) and the first peak position information obtained in step S209 are synthesized.

Synthesis of Peak Position Information

Now, peak position information synthesizing processing that is performed in step S213 will be described with reference to a flowchart in FIG. 5. First, in step S501, with respect to one of the focus detection areas that are arranged as shown in FIG. 7B, if the first peak position information has been acquired as shown in FIG. 8A, it is judged whether the first peak position information is usable. For example, in FIG. 8A, focus detection areas in which "x" is shown are the focus detection areas with respect to which the first peak position information is unusable.

It should be noted that AF evaluation values may be used to judge whether the object has moved out of a focus detection area during a scan. Moreover, if the object has not moved out of a focus detection area during a scan, the AF evaluation values form a hill-like shape in accordance with the position of the focus lens 104 and the distance to the object, whereas if the object has moved, the hill-like shape is not formed. This phenomenon may be used to judge whether the object has moved.

If it is judged in step S501 that the first peak position information is not usable, then, in step S503, it is judged whether the second peak position information is usable. For example, as shown in FIG. 8B, if "x" is shown in the same focus detection area, the second peak position information is unusable. If the second peak position information is usable, the second peak position information is adopted in step S504, and the processing proceeds to step S510.

If it is judged in step S503 that the second peak position information is also not usable, neither the first peak position information nor the second peak position information is usable, and therefore, in step S505, the data with respect to that focus detection area is judged to be improper data, and the processing proceeds to step S510.

On the other hand, if it is judged in step S501 that the first peak position information is usable, then, in step S502, it is judged whether the second peak position information is usable. If it is judged that the second peak position information is not usable, the first peak position information is adopted in step S506, and the processing proceeds to step S510.

If it is judged in step S502 that the second peak position information is usable, in step S507, it is judged whether the second peak position information is the peak position information indicating that the focus is at a closer distance than the first peak position information. When affected by AF evaluation values of a background object due to focusing on the background, the peak position of an object that is present on the close distance side is affected by the peak position of the object that is present on the infinite distance side, and shows a numerical value that is close to the peak position of the infinite distance side. If the peak position of the object on the close distance side is closer to the close distance side than that numerical value indicates, it can be judged that focus detection has been performed with correct AF evaluation values of that object. If it is judged that the second peak position information is the peak position information indicating that the focus is at a closer distance than the first peak position information, the second peak position information is adopted in step S508, and the processing proceeds to step S510. Moreover, if it is judged that the second peak position information is the peak position information indicating that the focus is at a farther distance than the first peak position information, the first peak position information is adopted in step S509, and the processing proceeds to step S510.

In step S510, it is judged whether information with respect to all the focus detection areas in the integrated focus detection area 801 has been checked, and if checking with respect to all the focus detection areas has been completed, the processing is ended. If checking with respect to all the focus detection areas has not been completed, the processing returns to step S501, and the above-described processing is repeated with respect to another focus detection area.

Figure 5:
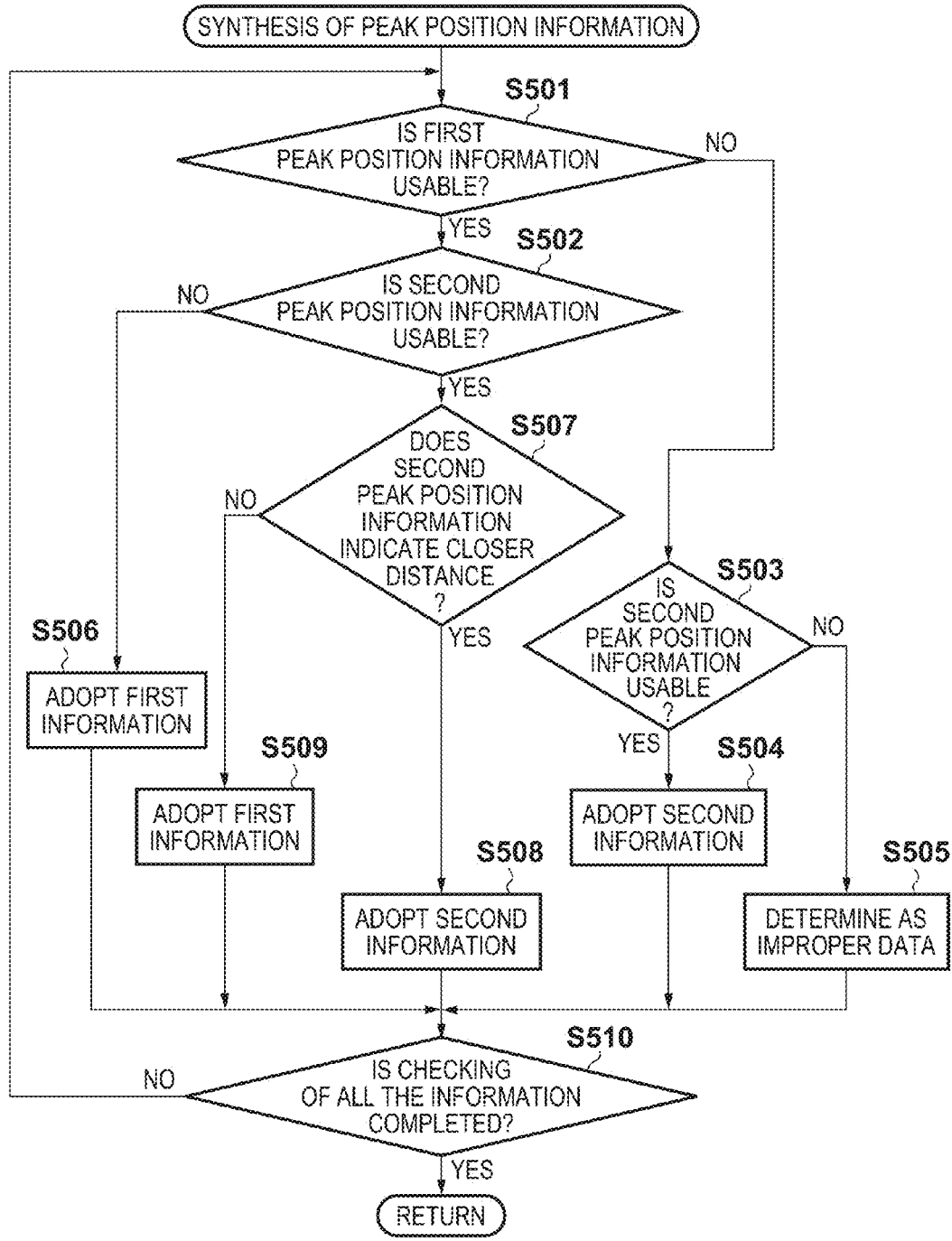
FIG. 5 is a flowchart of peak position information synthesizing processing according to an embodiment.

When the first peak position information is as shown in FIG. 8A, and the second peak position information is as shown in FIG. 8B, synthesized peak position information is obtained as shown in FIG. 8C by the above-described synthesizing processing illustrated in FIG. 5. That is to say, in each focus detection area, comparison between the first peak position information and the second peak position information is performed, and the peak position information that is not indicated by "x" is used. Moreover, if the first peak position information and the second peak position information differ from each other, the peak position information indicating the close distance side (902, 1002, 1102, 1103) is used as synthesized peak position information.

Next, in step S214, a peak position to be focused is selected using the synthesized peak position information. It should be noted that the method for selecting the peak position to be focused is the same as the processing in step S210. Then, it is judged whether objects are distributed within a given distance range using corrected peak position information in the same manner as the processing described in step S211. If it is judged that the objects are distributed within the given distance range, the procedure proceeds to step S205, and the above-described processing is performed. It should be noted that in this case, in step S205, the focus lens 104 is moved to the in-focus position determined in step S214.

Figure 10:
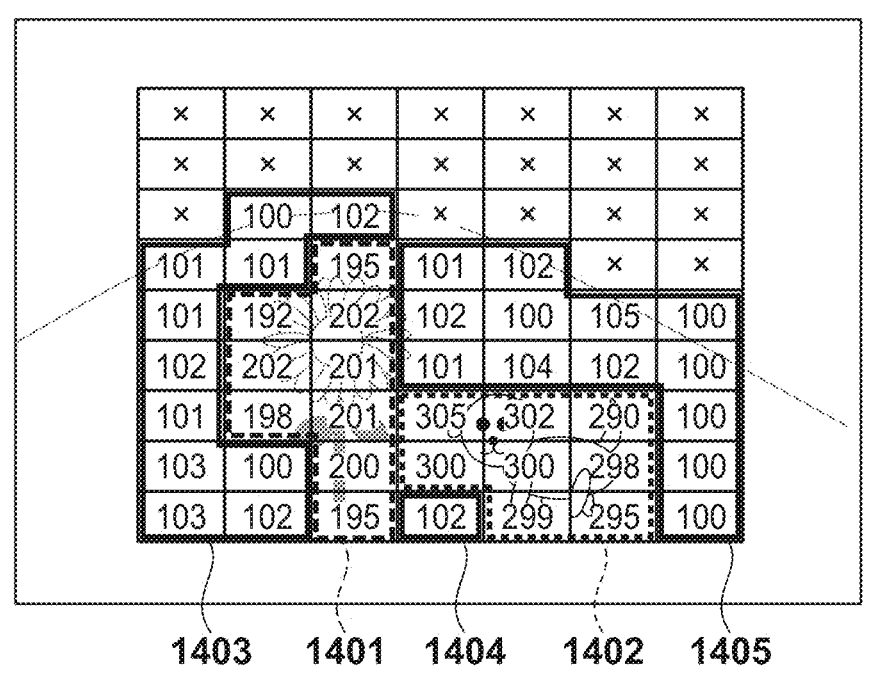

On the other hand, if it is judged that the objects are not within the given distance range, then, an object area is generated in step S216. In this embodiment, the image is divided into areas based on color information and luminance information within the screen, and an area that seems to include an object is determined. If differences in synthesized peak position information of focus detection areas corresponding to the area that seems to be the object are within a given range, this area is set as an object area. Moreover, if there are a plurality of areas that seem to include an object, and differences in synthesized peak position information of focus detection areas corresponding to those areas are within the given range, those focus detection areas are set as a single object area. It should be noted that any other method may be used that is capable of dividing an image into areas based on information on that image, distance information of an object, and the like and setting an object area. Although the division into areas for the purpose of detecting an object may be achieved by any dividing method, if the division is performed in such a manner that the divided areas match the focus detection areas, it is possible to easily match the color information and luminance information of the areas and the distance information of the object. FIG. 10 shows object areas 1401 to 1405 as an example of the case where the division is performed in such a manner that the resulting divided areas match the focus detection areas.

Next, in step S217, a representative peak position (representative in-focus position) is set for each generated object area. It should be noted that a method for setting a representative peak position will be described later using FIGS. 6A and 6B.

Next, in step S218, the priority order of the object areas is set. Here, the priority order of the object areas refers to the order in which focus is adjusted to the object areas during focus bracketing, and images are captured while sequentially adjusting focus to the object areas in decreasing order of priority. With regard to this priority order, a first level of priority is assigned to an object area corresponding to a focus detection area having a representative peak position that is the in-focus position determined in step S214, and subsequent levels of priority are assigned in decreasing order of object area size, in increasing order of distance from the positions of the object areas to the center of the image, or the like.

Next, in step S219, it is judged whether the SW2 (120) is pressed. If it is judged that the SW2 (120) is not pressed, the procedure returns to step S219, and judgment with respect to the SW2 (120) is repeated. If it is judged that the SW2 (120) is pressed, then, in step S220, focus bracketing processing is performed while sequentially moving the focus lens 104 to positions at each of which the corresponding object area is in focus, based on the priority order determined in step S218.

Next, in step S221, based on the peak position information of each object area, blurring processing by image processing is applied, and the processing is ended. The amount of blur produced by blurring processing by image processing varies depending on differences in peak position among the object areas. For example, if the peak position differences among the object areas are greater than a given value, optical blur is significant, and therefore blurring processing is not applied any more, whereas if the differences are small, the amount of blur produced by image processing is increased.

Setting of Representative Peak Position of Each Object Area

Figure 6A:
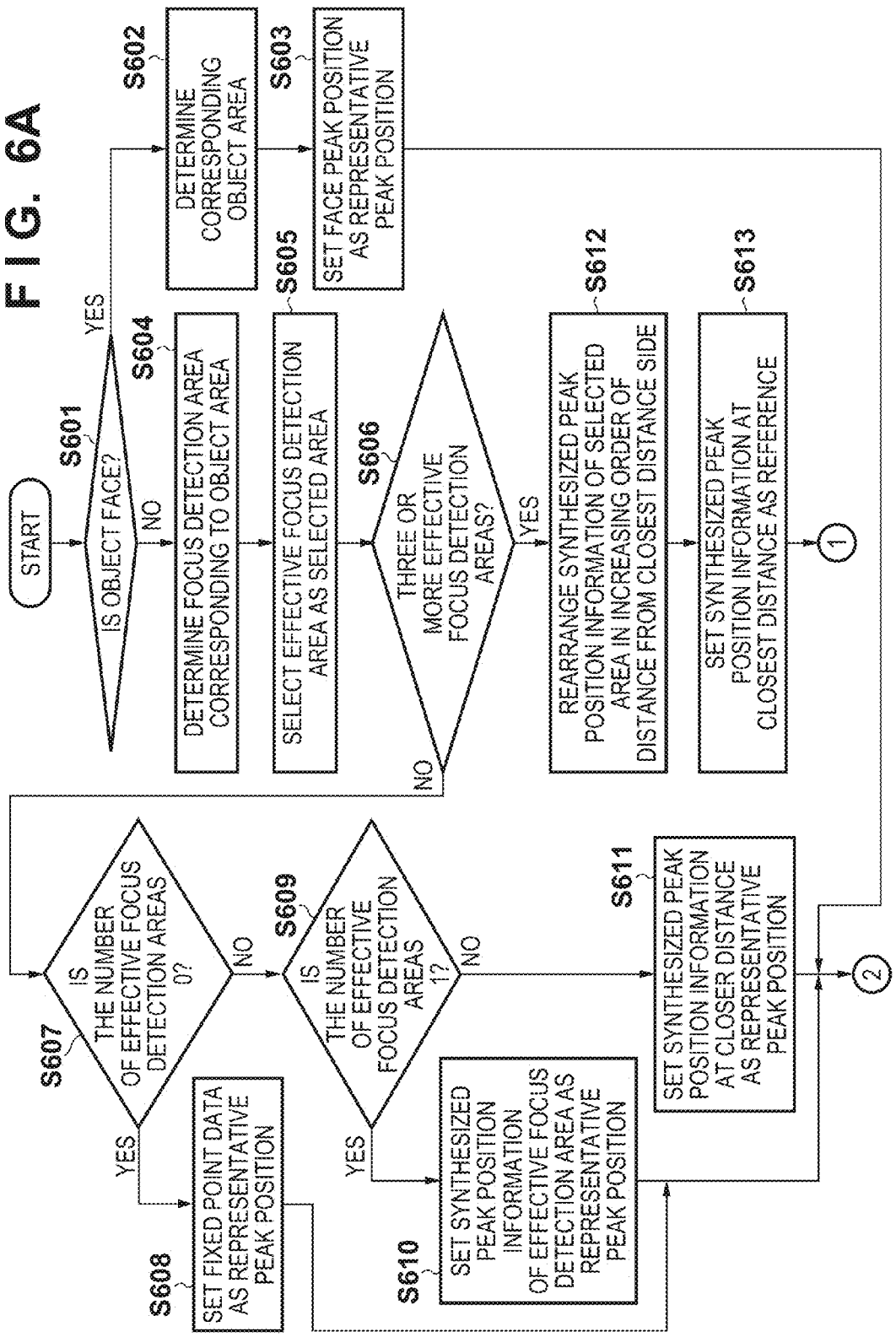
FIGS. 6A and 6B are flowcharts of processing for setting a representative peak position of each object area according to an embodiment.
Figure 6B:
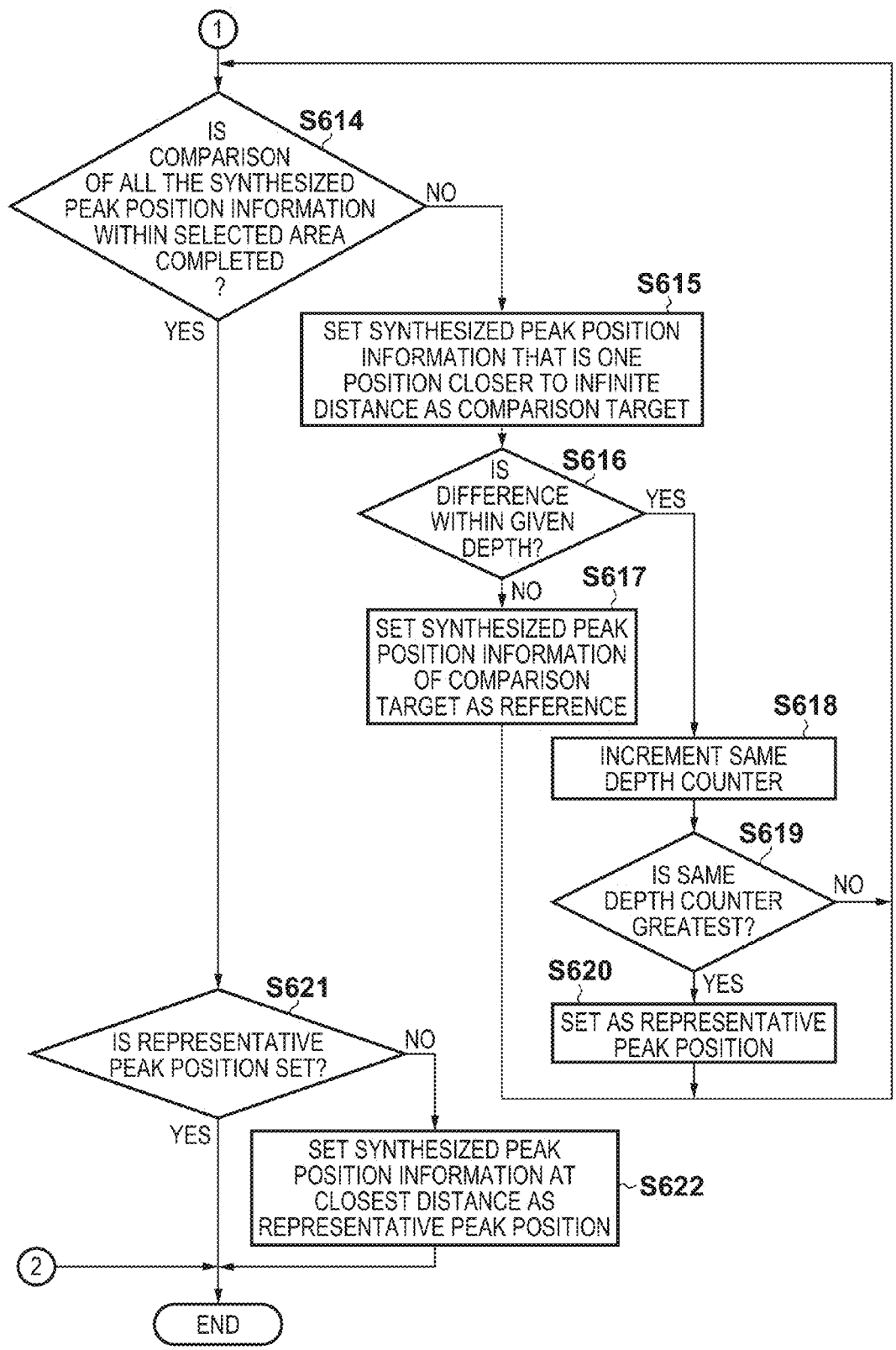

Processing for setting a representative peak position of each object area, which is performed in step S217, will be described with reference to FIGS. 6A and 6B. It should be noted that the processing shown in FIGS. 6A and 6B is repeatedly performed until processing of all the object areas generated in step S216 is ended. First, in step S601, it is judged whether an object in the shooting scene is a face. If it is judged that the object is a face, an object area corresponding to the detected face is determined in step S602. It should be noted that the object area corresponding to the face can be determined by selecting an object area, of the object areas generated in step S216, that is located at a position corresponding to the position of the detected face.

Next, in step S603, the peak position of the integrated focus detection area that has been reset as the face area during the additional focus adjustment scan is set as a representative peak position of the corresponding object area. Thus, a suitable peak position can be associated with the object area corresponding to the face.

On the other hand, if it is judged in step S601 that the object is not a face, then, in step S604, focus detection areas corresponding to the object areas are selected. The focus detection areas corresponding to the object areas refer to areas such as those enclosed by dashed lines and solid lines as indicated by reference numerals 1401 to 1405 in FIG. 10. The areas 1403, 1404, and 1405 are integrated into a single integrated focus detection area because the synthesized peak position information of these areas is within a given range.

That is to say, an integrated focus detection area 1, which is indicated by reference numeral 1401, an integrated focus detection area 2, which is indicated by reference numeral 1402, and an integrated focus detection area 3, which is a background area into which the areas 1403, 1404, and 1405 are integrated, are selected as the focus detection areas corresponding to the object area.

Next, in step S605, a focus detection area, of the focus detection areas selected in step S604, with respect to which focus detection has been correctly performed is selected as a selected area. In the example shown in FIG. 10, the synthesized peak position information is set in all the focus detection areas selected as the object areas; however, there may be cases where appropriate information has not been obtained (indicated by "x"), and thus, focus detection areas excluding such a focus detection area are set as the selected area here.

Next, the number of focus detection areas contained in the selected area, that is, effective focus detection areas having synthesized peak position information is determined. First, in step S606, it is judged whether three or more effective focus detection areas are contained in the selected area. If it is judged that the number of effective focus detection areas is smaller than 3, then, in step S607, it is judged whether the number of effective focus detection areas contained in the selected area is 0.

If it is judged that the number of effective focus detection areas is 0, then, in step S608, the representative peak position of the object area of interest is set at a predetermined fixed point (e.g., a focus lens position at which the focus is at infinity), and the processing is ended. It should be noted that the representative peak position means a peak position corresponding to that object area, and refers to a focus lens position at which focus can be adjusted to a wide range in that object area.

If it is judged that the number of effective focus detection areas is not 0, then, in step S609, it is judged whether the number of effective focus detection areas is 1. If it is judged that the number of effective focus detection areas within the selected area is 1, the synthesized peak position information of that focus detection area is taken as the representative peak position of the object area in step S610. If it is judged that the number of effective focus detection areas is not 1, it turns out that the number of effective focus detection areas contained in the selected area is 2, so that in step S611, the synthesized peak position information of one of the two effective focus detection areas in which focus is achieved at the closer distance is taken as the representative peak position.

If it is judged in step S606 that there are three or more effective focus detection areas, then, in step S612, the synthesized peak position information of the focus detection areas within the selected area is rearranged in increasing order of distance at which focus is achieved. Next, in step S613, the synthesized peak position information indicating that focus is achieved at the closest distance is set as the first reference data.

Next, in step S614, it is judged whether comparison has been performed with respect to all the synthesized peak position information of the focus detection areas within the selected area. If comparison with respect to all the synthesized peak position information has not yet been performed, then, in step S615, a synthesized peak position that is one position closer to the infinite distance is set as a comparison target to be compared with the reference data. In a first comparison, a synthesized peak position that is one position closer to the infinite distance than the synthesized peak position information indicated by the reference data is used as the synthesized peak position information to be compared, and in second and subsequent comparisons, a synthesized peak position that is one position closer to the infinite distance than the synthesized peak position information that has immediately previously been used as the comparison target is used as the comparison target.

Next, in step S616, a difference between the reference data and the synthesized peak position information of the comparison target is calculated. If it is judged that the difference is within a given depth of focus, for example, the reference data and the synthesized peak position information of the comparison target are within a single unit of depth, then, in step S618, a same depth counter is incremented. The same depth counter is provided for the focus detection area of the reference data and is used to determine how many focus detection areas are at the same depth as that focus detection area.

Next, in step S619, it is judged whether the same depth counter provided for the focus detection area of the current reference data is the greatest as compared with the other focus detection areas within the selected area. If it is judged that the same depth counter is the greatest, the synthesized peak position information that is currently set as the reference data is set as the representative peak position. This processing makes it possible to obtain the depth at which the synthesized peak position information is most concentrated. If it is judged that the same depth counter is not the greatest, the processing returns to step S614.

If it is judged in step S616 that the difference lies outside the given depth, the synthesized peak position information of the focus detection area serving as the comparison target is set as reference data in step S617, and the processing returns to step S614. If it is judged in step S614 that comparison with respect to all the synthesized peak position information of the effective focus detection areas within the selected area has been performed, then, in step S621, it is judged whether the representative peak position is set. If it is judged that the representative peak position is set, the processing is ended.

If it is judged that the representative peak position is not set, it turns out that no effective focus detection areas within the selected area have synthesized peak position information at the same depth. In this case, in step S622, the synthesized peak position information at the closest distance, of the synthesized peak position information of the effective focus detection areas, is set as the representative peak position, and the processing is ended.

It should be noted that in the above-described example, a case where the reference data with respect to which the same depth counter is the greatest is set as the representative peak position has been described; however, the present invention is not limited to this. For example, a statistical value, such as a median value, an average value, or a maximum value, of the synthesized peak position information distributed within a depth at which the same depth counter is the greatest may also be set as the representative peak position.

As described above, according to the present invention, it is possible to determine a representative peak position of an object that is divided into areas. Thus, shooting can be performed with focus lens positions that are suitable for each object that is divided into areas.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-280063, filed on Dec. 21, 2012 which is hereby incorporated by reference herein in its entirety.

What is claimed is:

1. An image capturing apparatus comprising:
    a focus detection unit configured to obtain an in-focus position for each of a plurality of preset focus detection areas, the in-focus position indicating a position to which a focus lens is to be driven in order to achieve focus;
    a setting unit configured to set an object area with respect to a captured image;
    an acquisition unit configured to acquire, for each object area set by the setting unit, a representative in-focus position, wherein the acquisition unit classifies the focus detection areas included in each object area into a plurality of groups in such a manner that differences between the in-focus positions of the focus detection areas that belong to each group fall within a first predetermined range, and obtains the representative in-focus position for each object area based on the in-focus positions of the focus detection areas included in a group to which a largest number of the focus detection areas belong;
    a determination unit configured to determine, if a plurality of object areas are set by the setting unit, a priority order of the object areas based on representative in-focus positions respectively acquired for the object areas; and
    a control unit configured to perform control so as to sequentially drive the focus lens to the representative in-focus positions of the object areas in decreasing order of the priority order determined by the determination unit and perform shooting with a plurality of different focus lens positions.

2. The image capturing apparatus according to claim 1, further comprising:
    an object detection unit configured to detect a predetermined object from the captured image,
    wherein if the predetermined object is detected by the object detection unit, the focus detection unit resets an area of the detected object as a focus detection area and obtains an in-focus position of the reset focus detection area.

3. The image capturing apparatus according to claim 2, wherein if the focus detection area is reset, the acquisition unit acquires the in-focus position of the reset focus detection area as the representative in-focus position of an object area corresponding to the detected object.

4. The image capturing apparatus according to claim 1, wherein if a plurality of object areas are set by the setting unit, the acquisition unit integrates a plurality of object areas so that the in-focus positions of focus detection areas included in each integrated object area are situated within a second predetermined range that is wider than the first predetermined range, and acquires the representative in-focus position for each integrated object area.

5. The image capturing apparatus according to claim 1, wherein the acquisition unit acquires an in-focus position on a closest distance side, of the in-focus positions of the focus detection areas included in the group to which the largest number of the focus detection areas belong, as the representative in-focus position.

6. The image capturing apparatus according to claim 1, wherein the acquisition unit acquires the representative in-focus position based on a statistical value of the in-focus positions of the focus detection areas included in the group to which the largest number of the focus detection areas belong.

7. The image capturing apparatus according to claim 1, wherein if no group that includes more than a predetermined number of focus detection areas exists, the acquisition unit acquires an in-focus position on a closest distance side, of the in-focus positions of the focus detection areas included in the object area, as the representative in-focus position.

8. The image capturing apparatus according to claim 1, wherein the determination unit determines the priority order based further on at least either of positions of the object areas in the image and sizes of the object areas.

9. A method for controlling an image capturing apparatus, the method comprising:
    obtaining an in-focus position for each of a plurality of preset focus detection areas, the in-focus position indicating a position to which a focus lens is to be driven in order to achieve focus;
    setting an object area with respect to a captured image;
    classifying the focus detection areas included in each object area into a plurality of groups in such a manner that differences between the in-focus positions of the focus detection areas that belong to each group fall within a first predetermined range;
    acquiring, for each object area representative in-focus position based on the in-focus positions of the focus detection areas included in a group to which a largest number of the focus detection areas belong;
    determining, if a plurality of object areas are set, a priority order of the object areas based on representative in-focus positions respectively acquired for the object areas; and
    performing control so as to sequentially drive the focus lens to the representative in-focus positions of the object areas in decreasing order of the priority order and perform shooting with a plurality of different focus lens positions.

10. A non-transitory readable storage medium having stored thereon a program which is executable by an image processing apparatus, the program having a program code for realizing the control method comprising:
    obtaining an in-focus position for each of a plurality of preset focus detection areas, the in-focus position indicating a position to which a focus lens is to be driven in order to achieve focus;
    setting an object area with respect to a captured image;
    classifying the focus detection areas included in each object area into a plurality of groups in such a manner that differences between the in-focus positions of the focus detection areas that belong to each group fall within a first predetermined range;
    acquiring, for each object area, a representative in-focus position based on the in-focus positions of the focus detection areas included in a group to which a largest number of the focus detection areas belong;

determining, if a plurality of object areas are set, a priority order of the object areas based on representative in-focus positions respectively acquired for the object areas; and performing control so as to sequentially drive the focus lens to the representative in-focus positions of the object areas in decreasing order of the priority order and perform shooting with a plurality of different focus lens positions.

11. An image capturing apparatus comprising:

a focus detection unit configured to obtain an in-focus position for each of a plurality of preset focus detection areas, the in-focus position indicating a position to which a focus lens is to be driven in order to achieve focus;

a setting unit configured to set object areas with respect to a captured image;

an acquisition unit configured to acquire, for each object area set by the setting unit, a representative in-focus position, wherein the acquisition unit classifies the focus detection areas included in each object area into a plurality of groups in such a manner that differences between the in-focus positions of the focus detection areas that belong to each group fall within a first predetermined range, and obtains the representative in-focus position for each object area based on the in-focus positions of the focus detection areas included in a group to which a largest number of the focus detection areas belong; and a control unit configured to perform control so as to sequentially drive the focus lens to the representative in-focus positions of the object areas and perform shooting with a plurality of different focus lens positions.

12. A method for controlling an image capturing apparatus, the method comprising:

obtaining an in-focus position for each of a plurality of preset focus detection areas, the in-focus position indicating a position to which a focus lens is to be driven in order to achieve focus;

setting object areas with respect to a captured image;

classifying the focus detection areas included in each object area into a plurality of groups in such a manner that differences between the in-focus positions of the focus detection areas that belong to each group fall within a first predetermined range;

acquiring, for each object area, a representative in-focus position based on the in-focus positions of the focus detection areas included in a group to which a largest number of the focus detection areas belong; and performing control so as to sequentially drive the focus lens to the representative in-focus positions of the object areas and perform shooting with a plurality of different focus lens positions.

13. A non-transitory readable storage medium having stored thereon a program which is executable by an image processing apparatus, the program having a program code for realizing the control method comprising:

obtaining an in-focus position for each of a plurality of preset focus detection areas, the in-focus position indicating a position to which a focus lens is to be driven in order to achieve focus;

setting object areas with respect to a captured image;

classifying the focus detection areas included in each object area into a plurality of groups in such a manner that differences between the in-focus positions of the focus detection areas that belong to each group fall within a first predetermined range;

acquiring, for each object area, a representative in-focus position based on the in-focus positions of the focus detection areas included in a group to which a largest number of the focus detection areas belong; and performing control so as to sequentially drive the focus lens to the representative in-focus positions of the object areas and perform shooting with a plurality of different focus lens positions.

* * * * *